(12) United States Patent
Wade

(10) Patent No.: US 7,159,082 B1
(45) Date of Patent: Jan. 2, 2007

(54) SYSTEM AND METHOD FOR THROTTLING MEMORY ACCESSES

(75) Inventor: Alan Jerome Wade, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/242,708

(22) Filed: Oct. 3, 2005

(51) Int. Cl.
*G06F 12/00* (2006.01)
*G06F 1/04* (2006.01)
*G06F 13/16* (2006.01)

(52) U.S. Cl. ............... 711/155; 711/167; 713/600
(58) Field of Classification Search ............ 710/35, 710/36, 107, 112, 113, 240, 241; 711/147, 711/148, 154–156, 163, 167; 713/600, 601
See application file for complete search history.

(56) References Cited

U.S. PATENT DOCUMENTS

| | | | |
|---|---|---|---|
| 4,556,952 A * | 12/1985 | Brewer et al. ............ | 711/106 |
| 5,917,496 A * | 6/1999 | Fujita et al. ............... | 345/422 |
| 6,199,127 B1 | 3/2001 | Ajanovic | |
| 6,356,470 B1 | 3/2002 | Sadler et al. | |
| 6,430,068 B1 | 8/2002 | Sadler et al. | |
| 6,505,265 B1 * | 1/2003 | Ishikawa et al. ........... | 710/113 |
| 6,564,288 B1 | 5/2003 | Olarig et al. | |
| 6,564,328 B1 | 5/2003 | Grochowski et al. | |
| 6,654,265 B1 | 11/2003 | Sadler et al. | |
| 6,662,278 B1 | 12/2003 | Kahn et al. | |
| 6,681,285 B1 * | 1/2004 | Ng ............................ | 710/309 |
| 6,826,670 B1 * | 11/2004 | Middleton et al. ......... | 711/205 |
| 2002/0066047 A1 | 5/2002 | Olarig et al. | |

* cited by examiner

*Primary Examiner*—Willis R. Wolfe, Jr.

(57) ABSTRACT

A power throttling method and system for a memory controller. In one embodiment, a throttle value and a counter for controlling memory accesses by the memory controller to one or more memory devices are provided in the memory controller. Responsive to a throttle control signal indicative of an over-current state, on each clock cycle, the value of the counter is incremented by one, the counter value is compared to the throttle value, and if the counter value is greater than the throttle value, issuance of a memory operation cycle during the clock cycle is prevented.

32 Claims, 5 Drawing Sheets

SYSTEM AND METHOD FOR THROTTLING MEMORY ACCESSES

CROSS-REFERENCE TO RELATED APPLICATIONS

This application is related to U.S. patent application Ser. No. 11/115,675, filed Apr. 27, 2005, entitled POWER THROTTLING SYSTEM AND METHOD FOR A MEMORY CONTROLLER; and U.S. patent application Ser. No. 11/242,686, filed Oct. 3, 2005, entitled SYSTEM AND METHOD FOR THROTTLING MEMORY POWER CONSUMPTION, which are hereby incorporated by reference in their entireties.

BACKGROUND

One of the main reasons for the rapid change and growth in computer power requirements is the increase in volume of data processed, stored, transmitted, and displayed. As a result, power requirements have grown very rapidly over the last few years. To control the increase in power dissipation due to increased frequency and gate count, operating voltages have been reduced, since power scales as the square of voltage but scales linearly with respect to the frequency. The increasing frequency demand forces the voltages down proportionally in order to maintain a reasonable level of power dissipation. Today, feeding this large amount of "ultraclean" current at low voltages with huge transient response capability has become a key technology driver of power management in computer systems.

Such power supply concerns assume particular significance in advanced memory designs currently being implemented. Additionally, rising bus and processing speeds are also demanding newer memory architectures that deliver improved performance by increasing clock frequencies and available bandwidth. However, due to such ever-increasing performance requirements, issues of power consumption and dissipation have become even more critical in the field of computer system design.

It is well-known that a computer system's memory can account for a significant portion of the computer system's total power consumption. Since the amount of power consumed by the memory can be quite variable and unpredictable depending on transactional throughput, current designs are typically overprovisioned in terms of power supply, cooling, line power, and the like, so as to maximize the potential power dissipation. Such overprovisioning is not only inefficient in terms of cost, but operates as a significant design constraint on the system memory density.

DETAILED DESCRIPTION OF THE DRAWINGS

Figure 1:
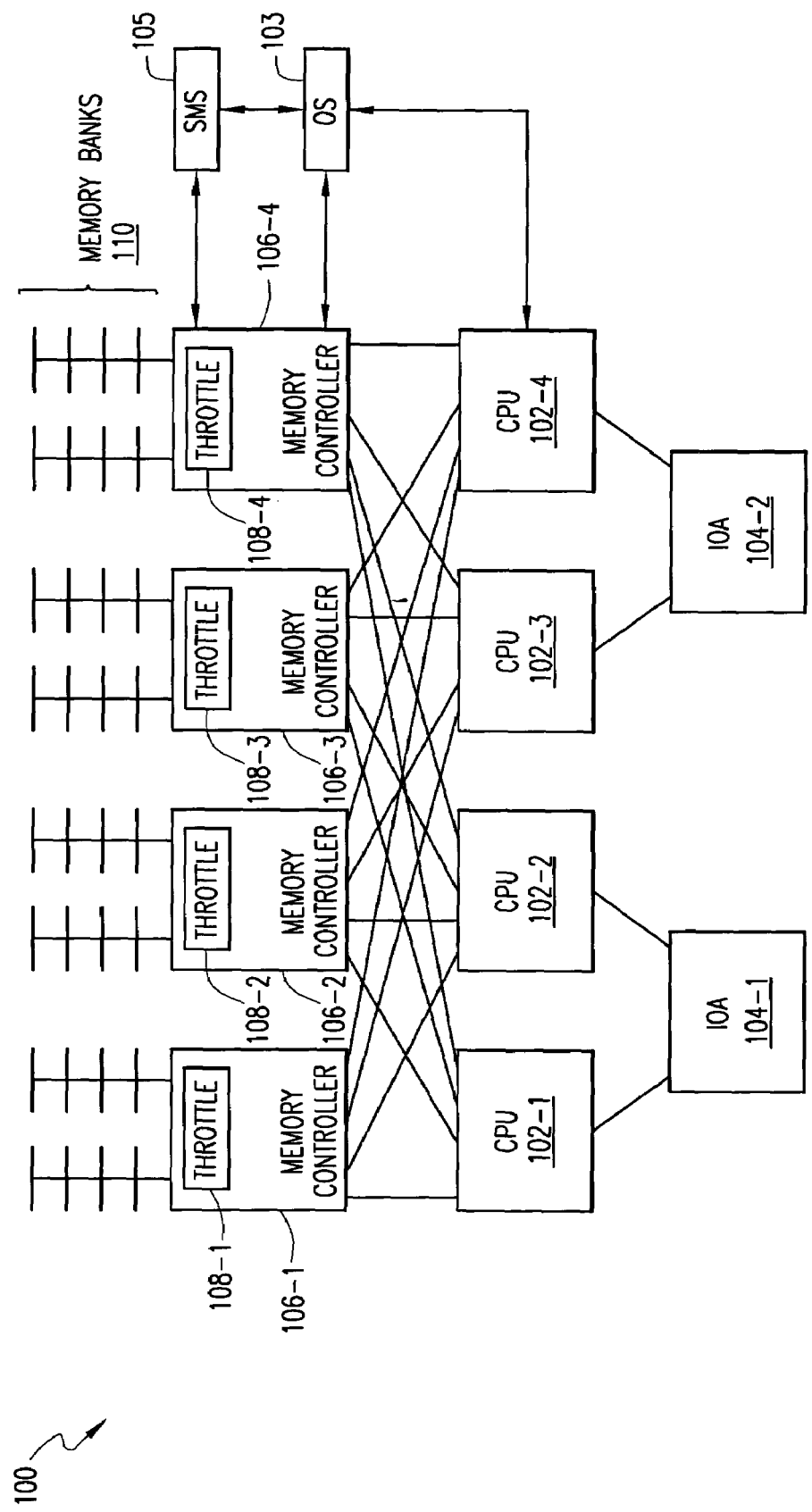
FIG. 1 depicts a block diagram of an embodiment of an exemplary computer system wherein a power throttling scheme may be practiced in accordance with the teachings of the present disclosure.

In the drawings, like or similar elements are designated with identical reference numerals throughout the several views thereof, and the various elements depicted are not necessarily drawn to scale. Referring now in particular to FIG. 1, depicted therein is a block diagram of an embodiment of an exemplary computer system 100 wherein a power throttling scheme for one or more memory controllers may be practiced in accordance with the teachings of the present disclosure. One or more processors, e.g., CPU 102-1 through CPU 102-4, are coupled to one or more input/output adapters ("IOAs") 104-1, 104-2 for carrying out input and output operations. Each of the processors is also coupled to memory controllers 106-1 through 106-4 which issue well-known memory operation cycles (such as, e.g., read cycles, write cycles, burst transaction cycles, etc.) to a number of memory banks 110. It should be realized that the memory banks 110 may be comprised of memory devices selected from at least one of dynamic random access memory ("DRAM") devices, static random access memory ("SRAM") devices, read-only memory ("ROM") devices, and so on. For example, in one configuration, each of the memory banks 110 may be implemented as Dual In-line Memory Modules ("DIMMs") having a plurality of a Double Data Rate ("DDR") DRAM devices with a particular density, e.g., 256 Mb, 512 Mb, 1 Gb or 2 Gb, etc. Also, the memory devices can be of any known or heretofore unknown DDR type, e.g., DDR2 (operable with 1.8 V), DDR3 (operable with 1.35V to 1.5V), and the like. Further, the DIMM configuration of an exemplary memory module may include unbuffered DIMMs, registered DIMMs ("RDIMMs"), or fully buffered DIMMs ("FBDs"), and may be configured as having one or more ranks (e.g., 2, 4, 8, or more).

One or more instances of an operating system ("OS") 103 are provided within the computer system 100 for controlling the operations therein. Those skilled in the art will recognize that OS 103 may comprise any UNIX-based operating system such as, for example, HP-UX®, AIX®, Linux®, Solaris®, etc., or other operating systems such as Microsoft® Windows®, Windows® XP®/NT®, as well as Macintosh® MacOS® operating system. Additionally, one or more system management software ("SMS") applications 105 are provided as part of the software environment of the computer system 100.

Regardless of any particular memory architecture, density, technology, and configuration, the memory banks 110 are powered by one or more power modules (not explicitly shown in this FIGURE), either disposed within the associated memory controllers or provided separately. At any rate, the power output of the power modules varies depending on the functional and operational utilization of the memory banks 110. As will be described in detail hereinbelow, appropriate throttle control logic 108-1 through 108-4 is provided in association with the memory controllers 106-1 through 106-4 for throttling the power consumption of the memory banks 110.

Figure 2:
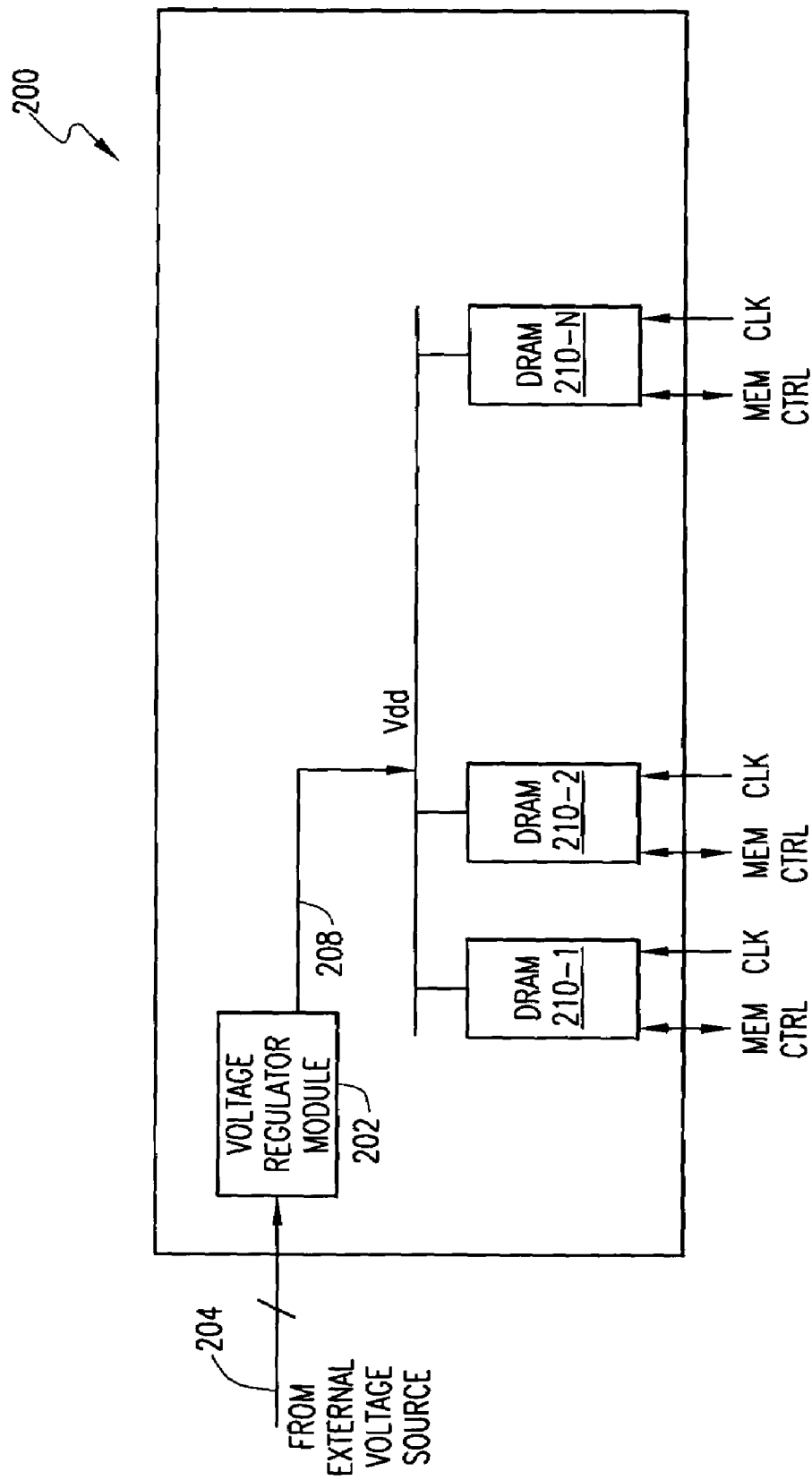
FIG. 2 depicts a block diagram of a power distribution system for a memory module according to one embodiment.

FIG. 2 depicts a block diagram of a power distribution system for a memory module 200 according to one embodiment. One or more memory devices 210-1 through 210-N are provided as part of the memory module 200, each receiving a first voltage path 208, typically referred to as a $V_{dd}$ path, that may be energized to appropriate voltage levels depending on the type, functionality, and design of the memory devices, e.g., from about 0.5V to 3.5V or more.

In one embodiment, at least one on-board voltage regulator module ("VRM") 202 may be provided as part of the memory board assembly module 200 for converting an externally supplied voltage level available on external source path 204 from a power module into appropriate an local voltage level that powers the $V_{dd}$ voltage path 208. Preferably, a high-frequency switching voltage converter capable of generating tightly-controlled voltage levels may be implemented as the on-board VRM 202. For instance, multi-phase synchronous Pulse-Width Modulated ("PWM") controllers, Low Drop-Out ("LDO") controllers, et cetera, that are capable of accepting unregulated supply voltages over a broad range may be configured to operate as a local voltage supply for the memory module 200.

Those skilled in the art should recognize upon reference hereto that although providing a tightly-controlled VRM as local voltage supply for on-board power requirements may give rise to a number of advantages in the power supply design of an electronic component such as the memory module 200, some designs may not incorporate any on-board VRMs. It should be apparent, however, that irrespective of how the power supply is designed, the memory module 200 can exhibit highly variable power consumption levels depending on the memory operation activity.

Figure 3:
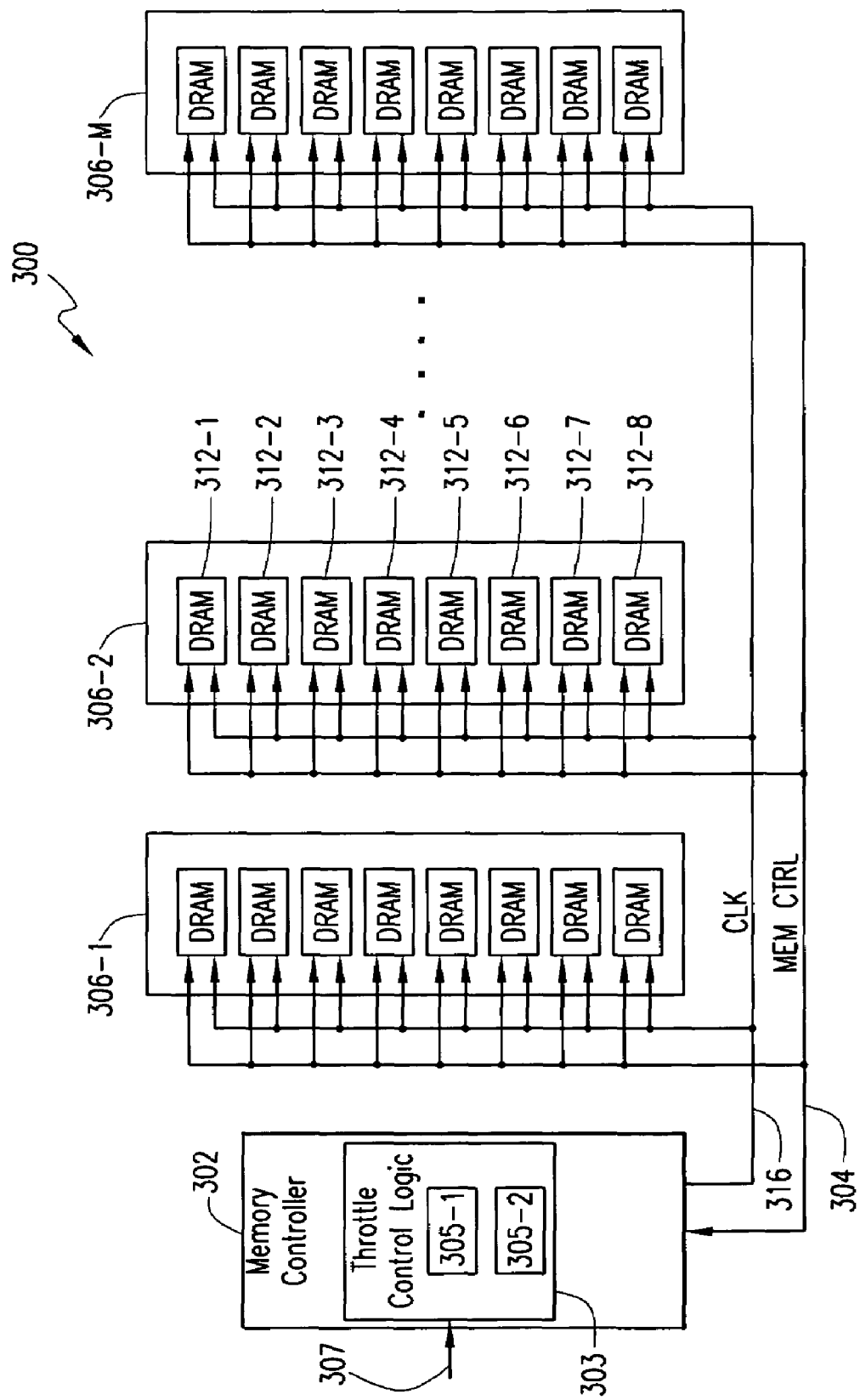
FIG. 3 depicts a block diagram of an exemplary memory controller and memory bank assembly according to one embodiment.

FIG. 3 depicts a block diagram of an exemplary memory controller and memory bank assembly 300 according to one embodiment. A memory controller 302, which is illustrative of the memory controllers 106-1 through 106-4 shown in FIG. 1, is operable to drive a bidirectional memory link 304 to which a plurality of memory boards 306-1 through 306-M are coupled. As exemplified by the memory board 306-2, each memory board includes eight DRAM devices 312-1 through 312-8. The memory controller 302 is operable to drive a clock signal to each of the memory boards 306-1 through 306-M via a clock bus 316. A system management bus ("SM bus") 310 is coupled to each of the memory boards 306-1 through 306-M. Although not explicitly shown in this FIGURE, each memory board 306-1 through 306-M also receives a power supply path for powering the DRAM components therein. In one arrangement, the supply voltage may be sourced from the memory controller 302 or from a separate voltage source.

A throttle control logic block 303 associated with the memory controller 302 includes a storage element, e.g., a register, 305-1 for storing a throttle value ("TV") and an x-bit counter 305-2 with a maximum value of Y−1. In one embodiment, x is equal to five (thus Y is equal to 32), such that the counter 305-2 is a five-bit counter that is incremented by one from 0 to 31 on each clock cycle and then begins again. The throttle control logic block 303 is operable responsive to a throttle control signal 307 for indicating whether memory accesses are to be issued by the memory controller 302 to the memory boards 306-1 through 306-M at a reduced rate (i.e., "throttled"). In particular, as described in greater detail below, the TV stored in the register 305-1 represents a number of memory operation cycles out of each 32 clock cycles that will be allowed when the throttle control signal 307 is in an "over-current" state, indicating that memory operation cycles, and hence memory accesses, are to be throttled.

Figure 4:
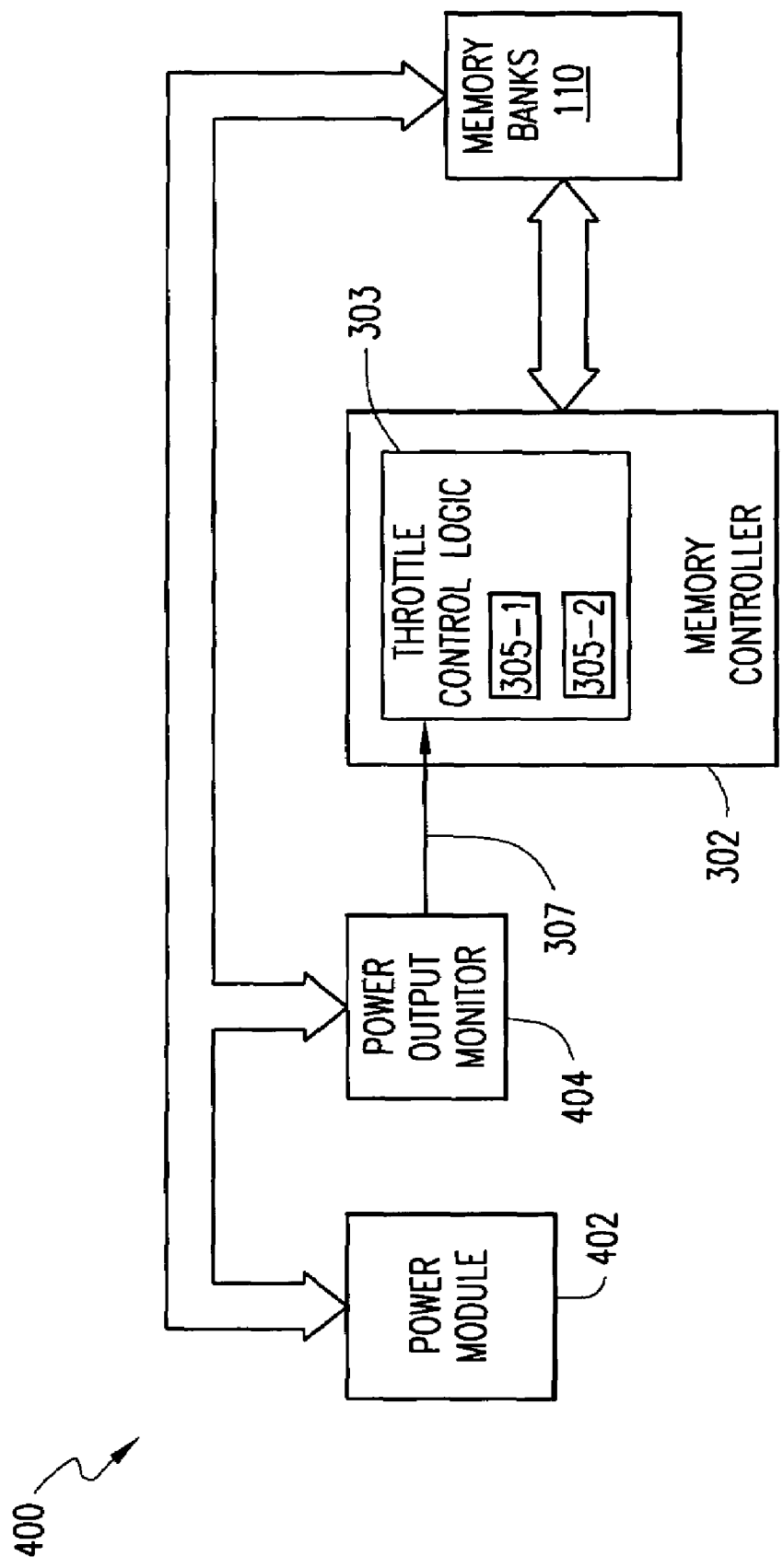
FIG. 4 depicts a block diagram of an exemplary power throttling system according to one embodiment.

FIG. 4 depicts a block diagram of an exemplary power throttling system 400 according to one embodiment which may be implemented in multiprocessor environments (such as, e.g., the computer system 100 shown in FIG. 1) as well as single-processor environments. A power module 402 is operable to supply power to one or more memory banks 110 controlled by the memory controller 302. A power output monitor 404 associated with the power module 402 for monitoring output power is operable to drive the throttle control signal 307 to the memory controller 302. If the monitor 404 detects a power level that is greater than a predetermined value, the throttle control signal 307 is driven to an over-current state which, in turn, indicates to the throttle control logic 303 of the memory controller 302 that memory operation cycles, and hence memory accesses, are to be throttled, whereby a reduced rate of memory operation cycles are issued to the memory bank 110.

As a result, the memory bank 110 uses less power when throttled with fewer memory operation cycles. When the power has returned to a level that is within an acceptable range, the power output monitor 404 drives the throttle control signal 307 to its original state, i.e., normal current state, thereby permitting the memory controller 302 to cease throttling, which results in the memory controller allowing all memory accesses. As a consequence, both power and performance of the memory bank 110 are increased.

It should be appreciated upon reference hereto that although the block diagram of the exemplary power throttling system 400 is shown with discrete blocks, some of the components may be integrated within a single assembly. For instance, the functionality of the power output monitor 404 may be integrated within the power module 402, which in turn may be provided as part of a controller board that includes the memory controller 302. By way of implementation, a differential operational amplifier ("op amp") or a resistor-based current sensor can be used for monitoring the output power. Additionally, the TV setting of the memory controller 302 may be provided to be programmable to any desired power level. In one embodiment, the contents of the register 305-1 may be configured by an OS running on the computer system. In another embodiment, the contents of the register 305-1 may be configured by a system management software application. In a still further embodiment, the contents of the register 305-1 may be dynamically configured by a user. If, for example, the total system power is too high over a period of time, the TV may be set to a low value. Upon returning to a more normal power level, the TV may be set to a higher value. In yet another embodiment, the counter 305-2 may be configured to count more or less than 32 clock cycles (i.e., by increasing or decreasing m), thereby increasing or decreasing the corresponding time window, respectively.

Figure 5:
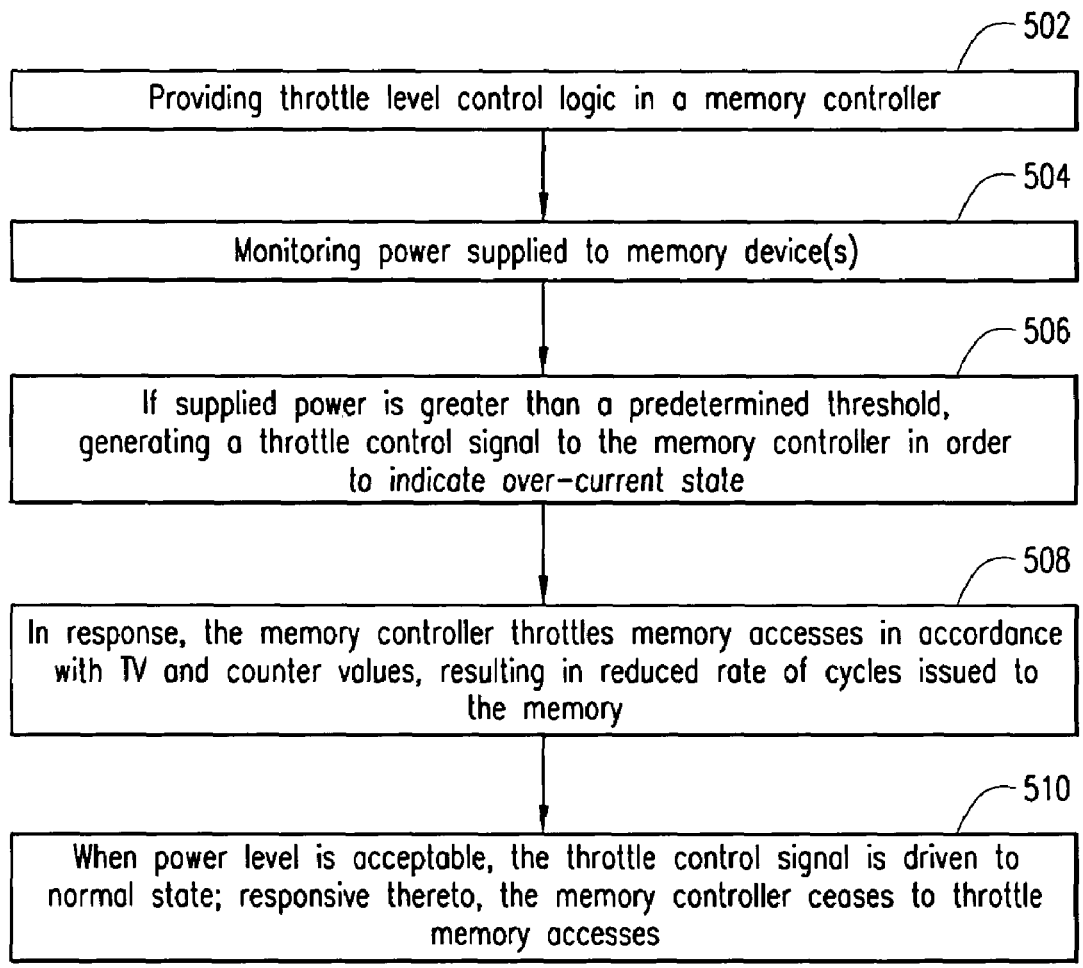
FIG. 5 is a flowchart of an exemplary power throttling method according to one embodiment.

FIG. 5 is a flowchart of an exemplary power throttling method according to one embodiment. At block 502, appropriate throttle level control logic, such as throttle control logic 303, is provided in a memory controller. Power supplied to the memory devices is monitored by way of a suitable power output monitor, such as the power output monitor 404 (block 504). If supplied output power is greater than a predetermined threshold value, a throttle control signal is generated to the memory controller in order to indicate an over-current state (block 506). In response, the memory controller throttles memory accesses in accordance with the TV stored in the register 305-1 and the value of the counter 305-2 (block 508). More particularly, the counter 305-2 is incremented by one on each clock cycle until it reaches a maximum value of Y−1, at which point it returns to zero and begins counting again. The value of the counter 305-2 is compared to the TV on each clock cycle and if the value of the counter is greater than the TV, no memory access is allowed (i.e., no memory operation cycle is issued) during that clock cycle. Hence, memory accesses are throttled.

When the output power level is within an acceptable range, the throttle control signal is driven to a normal current state. Responsive thereto, the memory controller ceases throttling memory accesses, such that all memory accesses are permitted (block 510). A result of the forgoing is that only a certain number of memory operation cycles are issued during a time window as defined by a combination of the throttle value and the size of the counter. For example, assuming the TV is set to eight, memory operation cycles will be issued only during the first eight clock cycles of every 32 clock cycles while the throttle control signal is indicative of an over-current state.

Based on the foregoing Detailed Description, it should be appreciated that an implementation of the embodiments described herein thus provides a technology-independent power throttling scheme for memory controllers disposed in any known or heretofore unknown computer environments. The embodiments are intended to be flexible enough to respond quickly to a surge in power so that power supply modules do not have to be over-designed. Additionally, the embodiments are sufficiently adaptable in that fairly precise power limits can be selected over a broad range of power supply spectrum. By throttling memory power consumption in real-time, a computer system can be designed to dissipate a significant amount of power in a dynamic manner, so that drastic overprovisioning in terms of power supply, cooling systems, line power design, etc., can be avoided advantageously.

Although the invention has been described with reference to certain exemplary embodiments, it is to be understood that the forms of the invention shown and described are to be treated as illustrative only. Accordingly, various changes, substitutions and modifications can be realized without departing from the scope of the present invention as set forth in the following claims.

What is claimed is:

1. A power throttling method for a memory controller, comprising:
   providing in the memory controller a throttle value and a counter for controlling memory accesses by the memory controller to one or more memory devices; and
   responsive to a throttle control signal indicative of an over-current state, on each clock cycle:
   incrementing a value of the counter by one;
   comparing the counter value to the throttle value; and
   responsive to the counter value being greater than the throttle value, preventing issuance of a memory operation cycle during the clock cycle.

2. The power throttling method for a memory controller as recited in claim 1, wherein the counter is a 5-bit counter.

3. The power throttling method for a memory controller as recited in claim 1, wherein the incrementing further comprises, when the counter value reaches a maximum value, incrementing the counter value to zero.

4. The power throttling method for a memory controller as recited in claim 1, wherein the throttle value is configurable by at least one of an operating system ("OS"), a system management software ("SMS") application, and a user.

5. The power throttling method for a memory controller as recited in claim 1, wherein the one or more memory devices comprise at least one of dynamic random access memory ("DRAM") devices, static random access memory ("SRAM") devices, and read-only memory ("ROM") devices.

6. The power throttling method for a memory controller as recited in claim 1, further comprising:

monitoring output power from a power module operating to power the one or more memory devices; and
if the output power is greater than a predetermined value, generating a throttle control signal indicative of an over-current state to the memory controller.

7. The power throttling method for a memory controller as recited in claim 6, further comprising:
   upon determining that the output power is within an acceptable range, driving the throttle control signal to a level indicative of a normal current state; and
   while the throttle control signal is indicative of the normal current state indicated by the throttle control signal, allowing issuance of memory operation cycles on all clock cycles.

8. The power throttling method for a memory controller as recited in claim 6, wherein the output power is monitored by at least one of a current sensor and an operational amplifier ("op amp").

9. The power throttling method for a memory controller as recited in claim 6, wherein the output power is monitored for identifying an over-current state.

10. A power throttling system for a memory controller, comprising:
    throttle control logic comprising a register for storing a throttle value and an x-bit counter, the throttle value and the x-bit counter for controlling memory accesses by the memory controller to one or more memory devices; and
    means, responsive to a throttle control signal indicative of an over-current state, for, on each clock cycle, incrementing a value of the x-bit counter by one, comparing the x-bit counter value to the throttle value, and, responsive to the x-bit counter value being greater than the throttle value, disallowing issuance of a memory operation cycle on the clock cycle.

11. The power throttling system for a memory controller as recited in claim 10, wherein the x-bit counter is a 5-bit counter.

12. The power throttling system for a memory controller as recited in claim 10, wherein the throttle value is configurable by at least one of an operating system ("OS"), a system management software application, and a user.

13. The power throttling system for a memory controller as recited in claim 10, wherein the one or more memory devices comprise at least one of dynamic random access memory ("DRAM") devices, static random access memory ("SRAM") devices, and read-only memory ("ROM") devices.

14. The power throttling system for a memory controller as recited in claim 10, further comprising:
    means for monitoring output power from a power module operating to power the one or more memory devices; and
    means for generating the throttle control signal indicative of an over-current state to the memory controller if the output power is greater than a predetermined value.

15. The power throttling system for a memory controller as recited in claim 14, further comprising:
    means for driving the throttle control signal to a level indicative of a normal current state upon determining that the output power is within an acceptable range; and
    means, operable responsive to the throttle control signal being indicative of the normal current state, for allowing issuance of memory operation cycles on all clock cycles.

16. The power throttling system for a memory controller as recited in claim 14, wherein the means for monitoring output power comprises at least one of a current sensor and an operational amplifier ("op amp").

17. The power throttling system for a memory controller as recited in claim 14, wherein the output power is monitored for identifying an over-current state.

18. A computer system, comprising:
at least one processor coupled to a memory controller, the memory controller being operable to issue memory operation cycles to one or more memory devices; and
throttle control logic associated with the memory controller comprising a register for storing a throttle value and an x-bit counter, the throttle value and the x-bit counter for controlling memory accesses by the memory controller to one or more memory devices,
wherein responsive to a throttle control signal indicative of an over-current state, on each clock, the throttle control logic increments a value of the x-bit counter by one, compares the x-bit counter value to the throttle value, and, responsive to the x-bit counter value being greater than the throttle value, disallows issuance of a memory operation cycle on the clock cycle.

19. The computer system as recited in claim 18, wherein the throttle control logic comprises a register for storing the throttle value, wherein the register is configurable by an operating system ("OS") executing on the computer system.

20. The computer system as recited in claim 18, wherein the throttle control logic comprises a register for storing the throttle value, wherein the register is configurable by a system management software application executing on the computer system.

21. The computer system as recited in claim 18, wherein the throttle control logic comprises a register for storing the throttle value, wherein the register is dynamically configurable by a user.

22. The computer system as recited in claim 18, wherein the power output monitor is operable to drive the throttle control signal to an over-current state if the output power is greater than a predetermined value.

23. The computer system as recited in claim 18, wherein the one or more memory devices comprise at least one of dynamic random access memory ("DRAM") devices, static random access memory ("SRAM") devices, and read-only memory ("ROM") devices.

24. The computer system as recited in claim 18, wherein the power output monitor is operable to drive the throttle control signal to a normal current state if the output power is within a predetermined normal range.

25. The computer system as recited in claim 24, wherein the throttle control logic is operable to allow issuance of memory operation cycles on all clock cycles while the throttle control signal is indicative of the normal current state.

26. A power throttling apparatus for a memory controller disposed in a computer system, comprising:
an x-bit counter having a maximum value of Y−1, wherein a value of the x-bit counter is incremented on each clock memory operation cycle;
a register for storing a throttle value; and
a power output monitor for monitoring output power from a power module operating to power the one or more memory devices, the power output monitor generating a throttle control signal to the memory controller;
wherein the throttle value indicates a number of memory operation cycles that will be permitted to be issued during each set of Y clock cycles while the throttle control signal corresponds to an over-current state.

27. The power throttling apparatus for a memory controller disposed in a computer system as recited in claim 26, wherein the throttle value is configurable by at least one of an operating system ("OS") executing on the computer system, a system management software application executing on the computer system, and a user.

28. The power throttling apparatus for a memory controller disposed in a computer system as recited in claim 26, wherein the power output monitor is operable to drive the throttle control signal to an over-current state if the output power is greater than a predetermined value.

29. The power throttling apparatus for a memory controller disposed in a computer system as recited in claim 26, wherein the one or more memory devices comprise at least one of dynamic random access memory ("DRAM") devices, static random access memory ("SRAM") devices, and read-only memory ("ROM") devices.

30. The power throttling apparatus for a memory controller disposed in a computer system as recited in claim 26, wherein the power output monitor comprises at least one of a current sensor and an operational amplifier ("op amp").

31. The power throttling apparatus for a memory controller disposed in a computer system as recited in claim 26, wherein the power output monitor is operable to drive the throttle control signal to a normal current state if the output power is within a predetermined normal range.

32. The power throttling apparatus for a memory controller disposed in a computer system as recited in claim 31, wherein the memory controller is operable to allow issuance of memory operation cycles on all clock cycles while the throttle control signal is indicative of the normal current state.

* * * * *